(12) United States Patent
Huang et al.

(10) Patent No.: US 7,819,372 B2
(45) Date of Patent: Oct. 26, 2010

(54) DISPLAY AND DETACHABLE BASE ASSEMBLY THEREOF

(75) Inventors: Wen-Hung Huang, Tucheng (TW); Kuan-Cheng Hsieh, Keelung (TW)

(73) Assignee: Hannspree, Inc., Taipei (TW)

( * ) Notice: Subject to any disclaimer, the term of this patent is extended or adjusted under 35 U.S.C. 154(b) by 506 days.

(21) Appl. No.: 12/034,512

(22) Filed: Feb. 20, 2008

(65) Prior Publication Data
US 2009/0206222 A1 Aug. 20, 2009

(51) Int. Cl.
A47B 91/00 (2006.01)
(52) U.S. Cl. ............. 248/346.01; 248/371; 248/222.11; 248/176.3; 361/679.21; 361/679.23
(58) Field of Classification Search ............ 248/346.01, 248/346.03, 176.3, 176.1, 177.1, 125.7, 127, 248/688, 676, 678, 466, 481, 158, 371, 407, 248/408, 274.1, 276.1, 288.31, 292.12, 221.11, 248/222.11, 917, 923; 361/679.21, 679.23, 361/381, 383
See application file for complete search history.

(56) References Cited

U.S. PATENT DOCUMENTS 4,549,710 A * 10/1985 Prince et al. ............. 248/183.3
6,318,694 B1 * 11/2001 Watanabe .................... 248/371
6,419,200 B1 * 7/2002 Tuneld et al. ............... 248/514
6,484,994 B2 * 11/2002 Hokugoh ..................... 248/371
6,801,426 B2 * 10/2004 Ichimura ............... 361/679.06
7,708,239 B2 * 5/2010 Watanabe et al. ........ 248/125.7
2002/0000505 A1 * 1/2002 Cho ............................ 248/371
2004/0217244 A1 * 11/2004 Wu et al. .................. 248/278.1

* cited by examiner

Primary Examiner—Terrell Mckinnon
Assistant Examiner—Todd M. Epps
(74) Attorney, Agent, or Firm—patenttm.us

(57) ABSTRACT

A display has a base, a pivot unit and a screen. The base has a hollow hole. The hollow hole is formed downwardly on the top of the base and has a top opening and at least one wedge hole. Each wedge hole is formed through and at the bottom edge of the bottom of the hollow hole. The pivot unit is mounted detachably in the hollow hole of the base and has at least one engaging element. Each engaging element is formed on the outer surface of the pivot unit and is mounted detachably through the wedge hole on the base. The screen has an indentation formed on the bottom of the screen for connecting the screen to the pivot unit. Therefore, the pivot unit can be detached conveniently from the base.

11 Claims, 6 Drawing Sheets

DISPLAY AND DETACHABLE BASE ASSEMBLY THEREOF

BACKGROUND OF THE INVENTION

1. Field of the Invention

The present invention relates to a display and a base assembly thereof, and more particularly to a display having a screen and a base assembly easily installed on or detached from the screen.

2. Description of Related Art

Flat panel displays such as liquid crystal displays (LCD) and plasma display panel (PDP) displays have replaced conventional cathode ray tube (CRT) displays because flat panel displays have advantages of light weight and slim appearance. An upright type flat panel display comprises a screen, a base and a connecting element. The screen is pivotally installed on the base by the connecting element to allow a user to pivot the screen up or down or to rotate the screen on the base.

However, how powerful function the connecting element has results in how complex structure the connecting element has. Furthermore, a complex structure of the connecting element is inconveniently for detaching the screen and the base.

In addition, the base requires a larger size in general for supporting the screen standing steady. Therefore large size flat panel display results in larger size base and larger size flat panel display also increases cost for transportation because of large package size requires more transportation room.

To overcome the shortcomings, the present invention provides a display having a conveniently installed base to mitigate or obviate the aforementioned problems.

SUMMARY OF THE INVENTION

The main objective of the invention is to provide a display having a screen and a base assembly easily installed on or detached from the screen.

The display in accordance with the present invention comprises a base, a pivot unit and a screen. The base has a hollow hole. The hollow hole is formed downwardly on the top of the base and has a top opening and at least one wedge hole. Each wedge hole is formed through and at the bottom edge of the bottom of the hollow hole. The pivot unit is mounted detachably in the hollow hole of the base and has at least one engaging element. Each engaging element is formed on the outer surface of the pivot unit and is mounted detachably through the wedge hole on the base. The screen has an indentation formed on the bottom of the screen for connecting the screen to the pivot unit. Therefore, the pivot unit can be detached conveniently from the base.

Other objectives, advantages and novel features of the invention will become more apparent from the following detailed description when taken in conjunction with the accompanying drawings.

DETAILED DESCRIPTION OF PREFERRED EMBODIMENT

Figure 1:
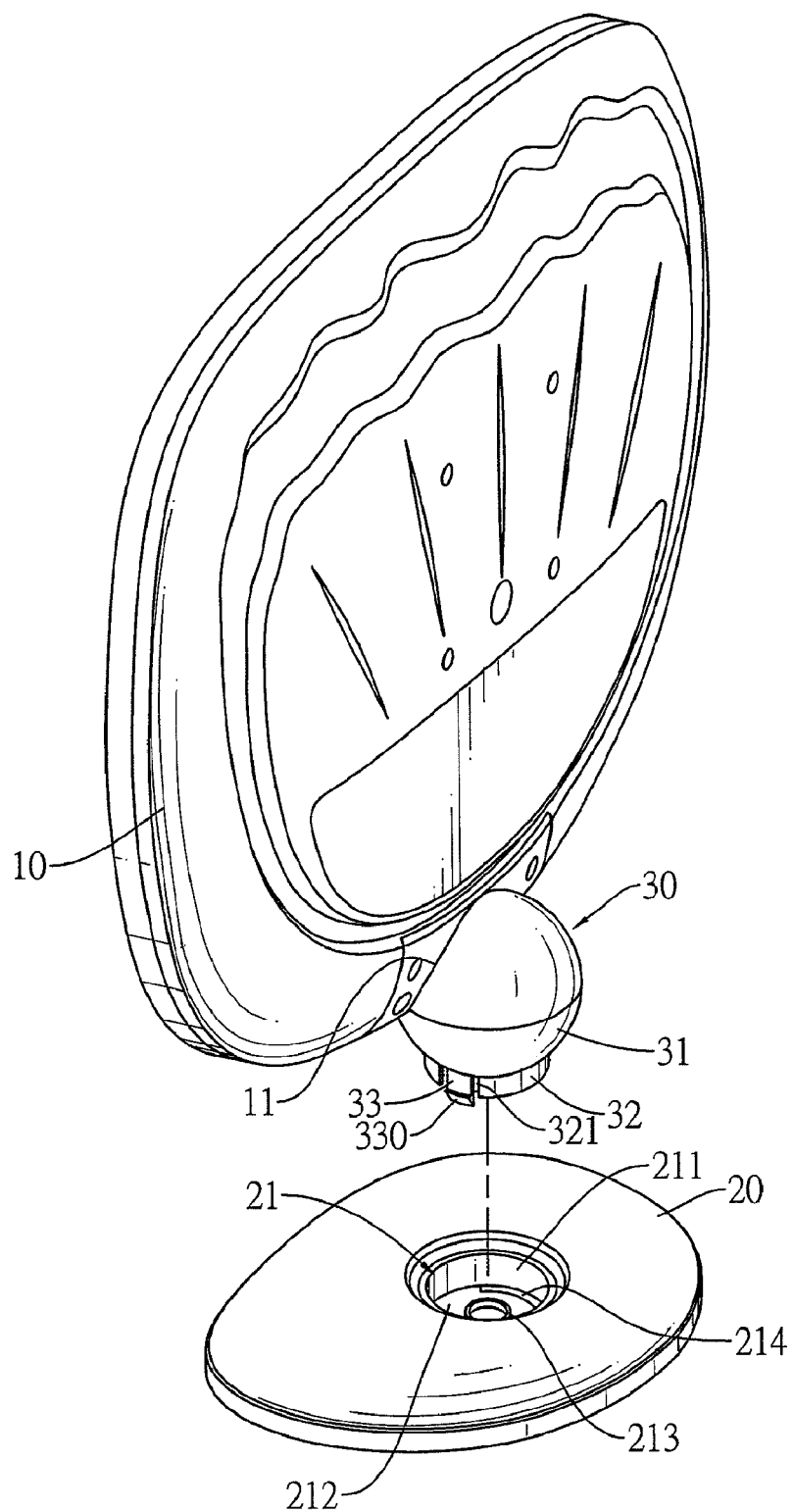
FIG. 1 is a perspectively exploded view of a display in accordance of the present invention.

With reference to FIG. 1, a display in accordance with the present invention comprises a base assembly and a screen (10).

Figure 3:
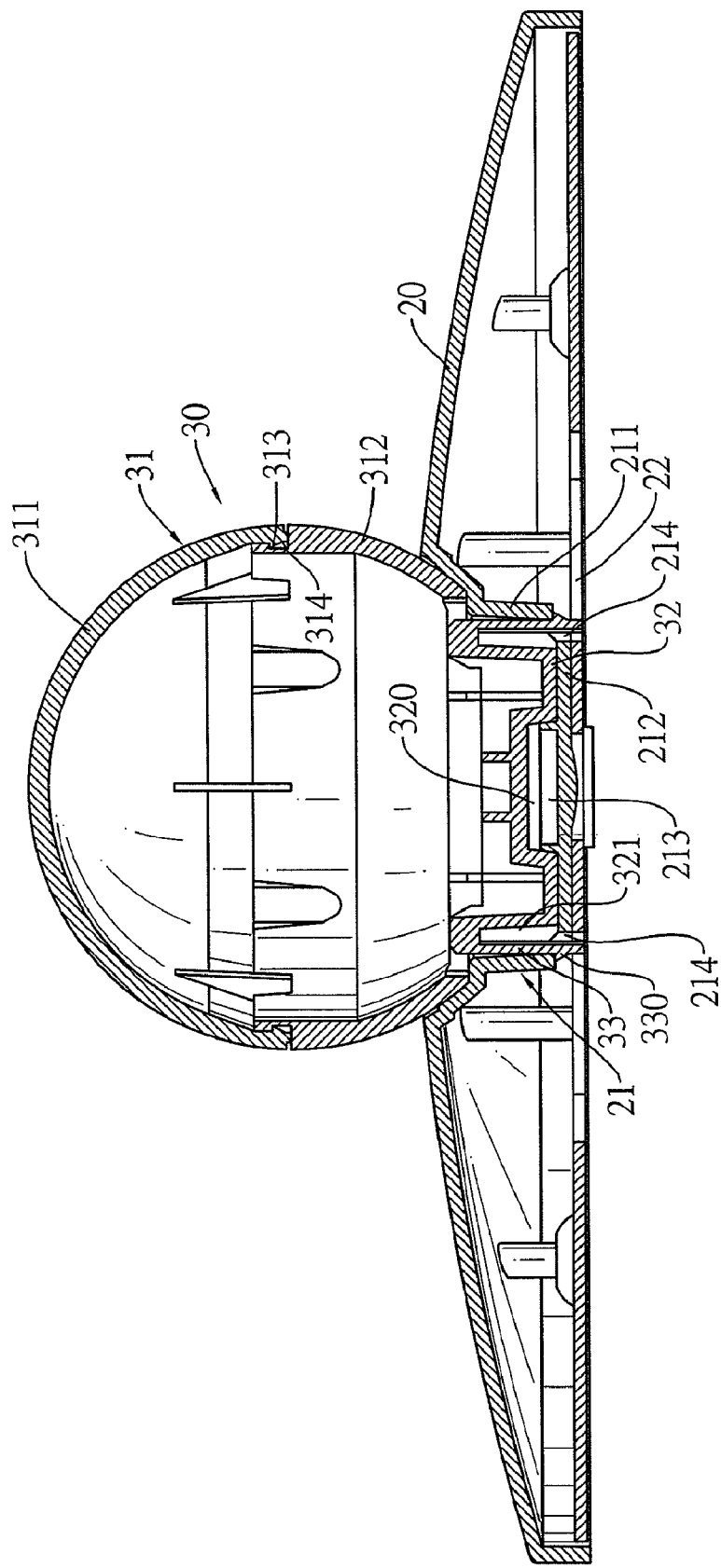
FIG. 3 is a side view in section of the base assembly.

With further reference to FIG. 3, the base assembly comprises a base (20) and a pivot unit (30). The base (20) has a hollow hole (21) and at least one optional notch (22). The hollow hole (21) is formed downwardly on the top of the base (20) and has a top opening, an inner side wall (211), an optional second pivot (213) and at least one wedge hole (214). The bottom (212) of the hollow hole (21) is connected to the bottom end of the inner side wall (211) of the hollow hole (21) and has a bottom edge being adjacent to the inner side wall (211) of the hollow hole (21). The second pivot (213) is formed on the top surface of the bottom (212) of the hollow hole (21). Each wedge hole (214) is formed through and at the bottom edge of the bottom (212) of the hollow hole (21). Each notch (22) is formed on the bottom of the base (20), corresponds and connects to the wedge hole (214) and exposes partial bottom end of the inner side wall (211) of the hollow hole (21) to allow a user to put a finger in the notch (22) and move the finger in the notch (22). In a preferred embodiment, the hollow hole (21) is cylindrical and has two opposite arc wedge holes (214), and the base (20) has two notches (22) corresponding to the wedge holes (214).

Figure 2:
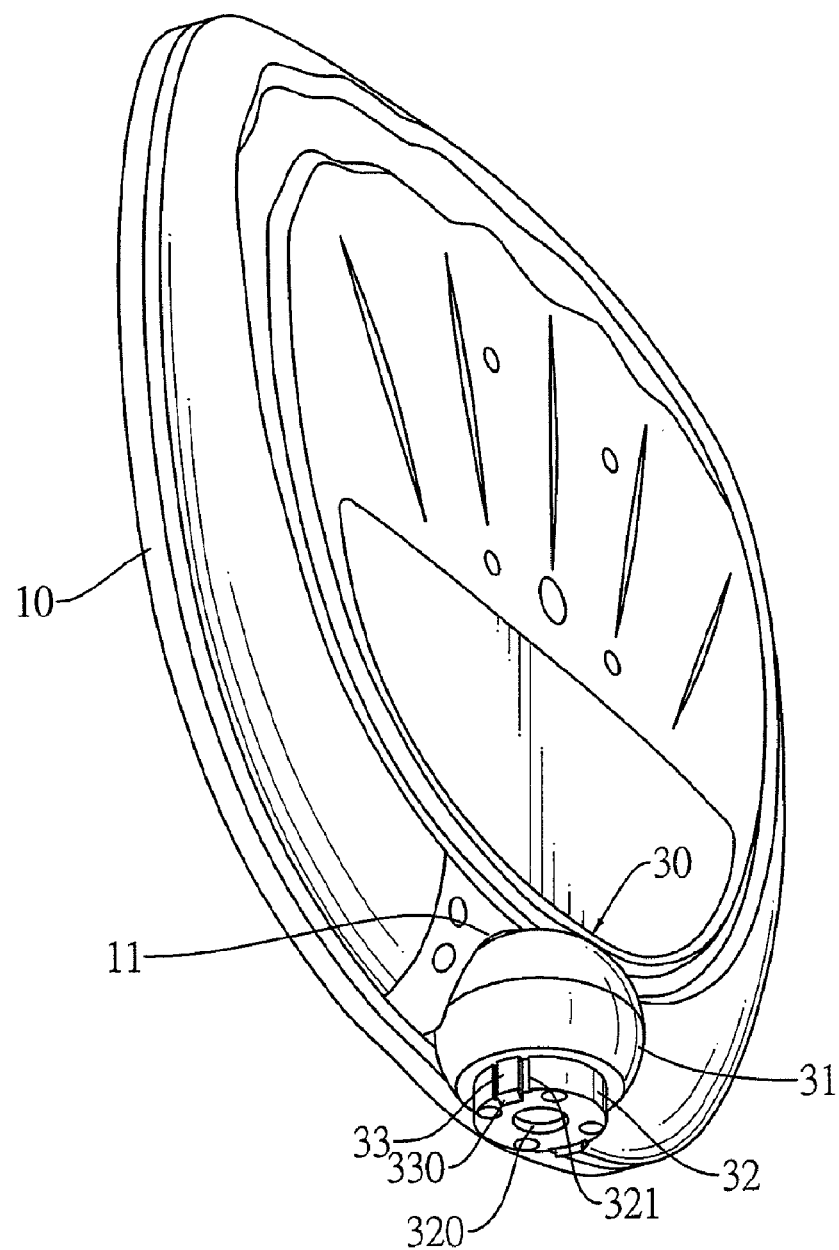
FIG. 2 is a perspective view of a screen connecting to a pivot unit of a base assembly in FIG. 1.

With further reference to FIG. 2, the pivot unit (30) is mounted detachably in the hollow hole (21) of the base (20) from the top opening of the hollow hole (21), comprises a spherical body (31), an extending pillar (32) and at least one engaging element (33). In a preferred embodiment, the pivot unit (30) has two opposite engaging elements (33). Furthermore, the width of the pivot unit (30) plus the width of the screen (10) may be equal to or smaller than the width of the screen plus the height of the base (20).

Figure 4:
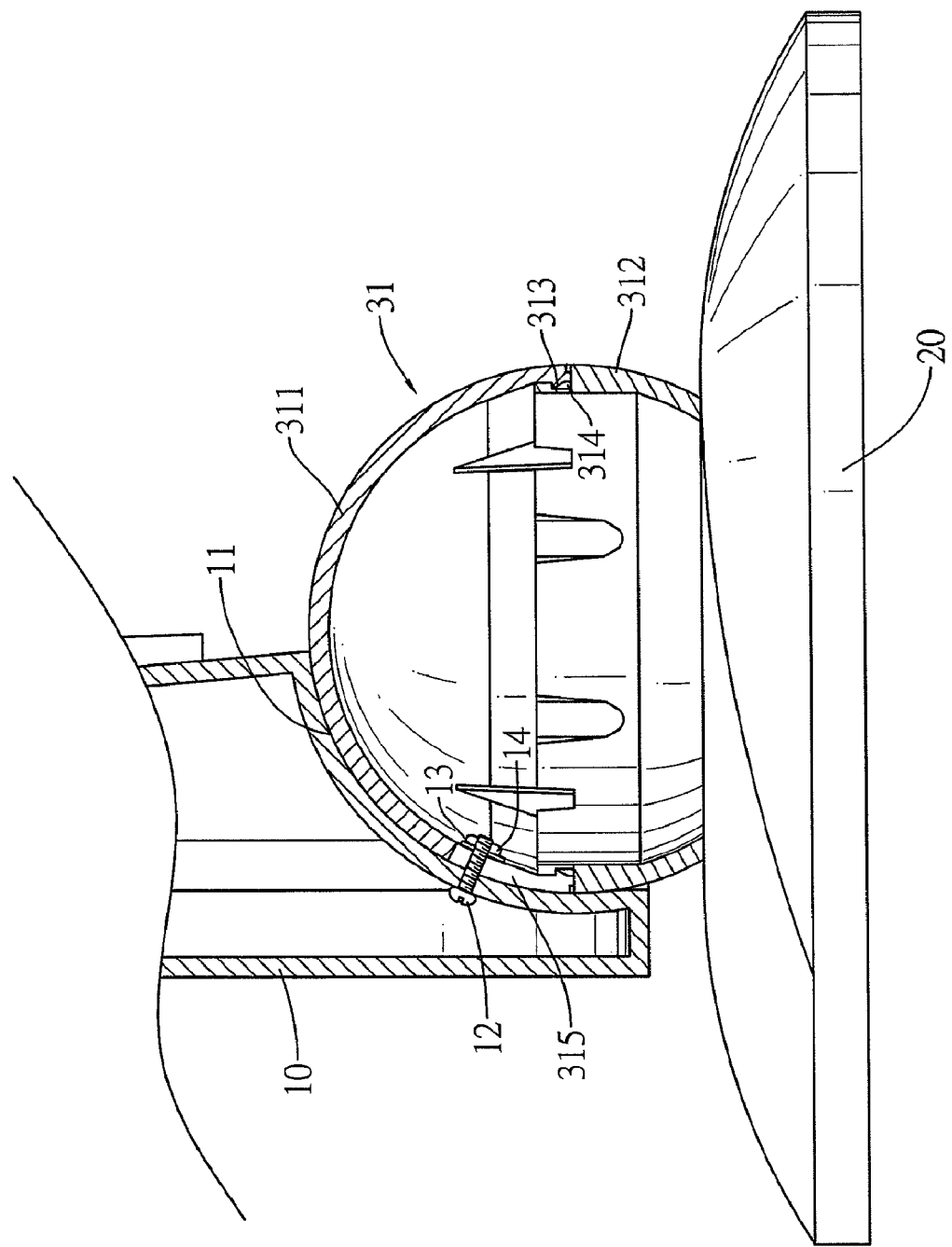
FIG. 4 is a side view in partial section of the display.

With further reference to FIG. 4, the spherical body (31) may further comprise an upper bowl (311), a lower bowl (312) and at least one optional moving slot (315). The upper bowl (311) has a lower opening and at least one hook (313). Each hook (313) is formed on the edge of the lower opening of the upper bowl (311), and the upper bowl (311) may have two hooks (313). The lower bowl (312) is connected between the upper bowl (311) and has an upper opening and at least one hook hole (314). The upper opening of the lower bowl (312) corresponds to the lower opening of the upper bowl (311). Each hook hole (314) is formed on the edge of the upper opening of the lower bowl (312), corresponds to one hook (313) on the upper bowl (311) and engages with the corresponding hook (313) on the upper bowl (311). The moving slot (315) is formed through the outer surface of the spherical body (31) and is vertical and narrow.

The extending pillar (32) is extended downwardly from the lower bowl (312) of the spherical body (31). Furthermore, the extending pillar (32) is mounted detachably in the hollow hole (21) of the base (20) and has an optional pivot hole (320) and at least one optional recess (321). In a preferred embodiment, the extending pillar (32) has two opposite recesses (321). The outer diameter of the extending pillar (32) matches the internal diameter of the hollow hole (21) on the base (20). The top of the extending pillar (32) connects to the lower bowl (312) of the spherical body (31). The pivot hole (320) is formed on the bottom of the extending pillar (32) and corresponds and connects detachably to the second pivot (213) in the hollow hole (21) on the base (20). Each recess (321) is formed on the outer surface of the extending pillar (32).

Each engaging element (33) is formed on the outer surface of the extending pillar (32) and between the recesses (321), may be extended from the lower bowl (312) of the spherical body (31), is mounted detachably through one wedge hole (214) on the base (20) and may further have a wedge (330). The thickness of the engaging element (33) is smaller than the width of the wedge hole (214) so the engaging element (33) is movable in the wedge hole (214) so as to allow the pivot unit (30) being rotatable on the base (20). The wedge (330) is formed on the bottom end of the engaging element (33), locates in the corresponding notch (22) and engages detachably with the exposed bottom end of the inner side wall (211) of the hollow hole (21). Accordingly, the user can detach the pivot unit (30) conveniently from the base (20) when the user places his finger in the notches (22) to press the engaging elements (33) and move the wedges (330) on the engaging elements (33) away from the exposed bottom ends of the inner side walls (211) of the hollow hole (21).

The screen (10) has an indentation (11), connects to the pivot unit (30) and may be perpendicular to the base (20). The width of the screen (10) may be smaller than the width of the base (20) so the base (10) supports the screen (10) standing steady. The width of the screen (10) plus the height of the base (20) may be equal to or smaller than the width of the base (20). The indentation (11) is formed on the bottom of the screen (10) or on the bottom and the rear of the screen (10) and corresponds and connects to the spherical body (31) of the pivot unit (30). Accordingly, with further reference to FIGS. 4 and 5, since the pivot unit (30) is attached on the bottom and rear of the screen (10), an L-shaped structure is constituted. Furthermore, the screen (10) connects to the spherical body (31) of the pivot unit (30) with a screw (12), a nut (14) and a washer (13). The screw (12) is mounted through the bottom of the screen (10) and the moving slot (315) so the screen (10) can be pivoted up or down with the screw (12) along the moving slot (315). The nut (14) is engaged with the screw (12) on the inner surface of the spherical body (31). The washer (13) is sandwiched in between the inner surface of the spherical body (31) and the nut (14).

Figure 5:
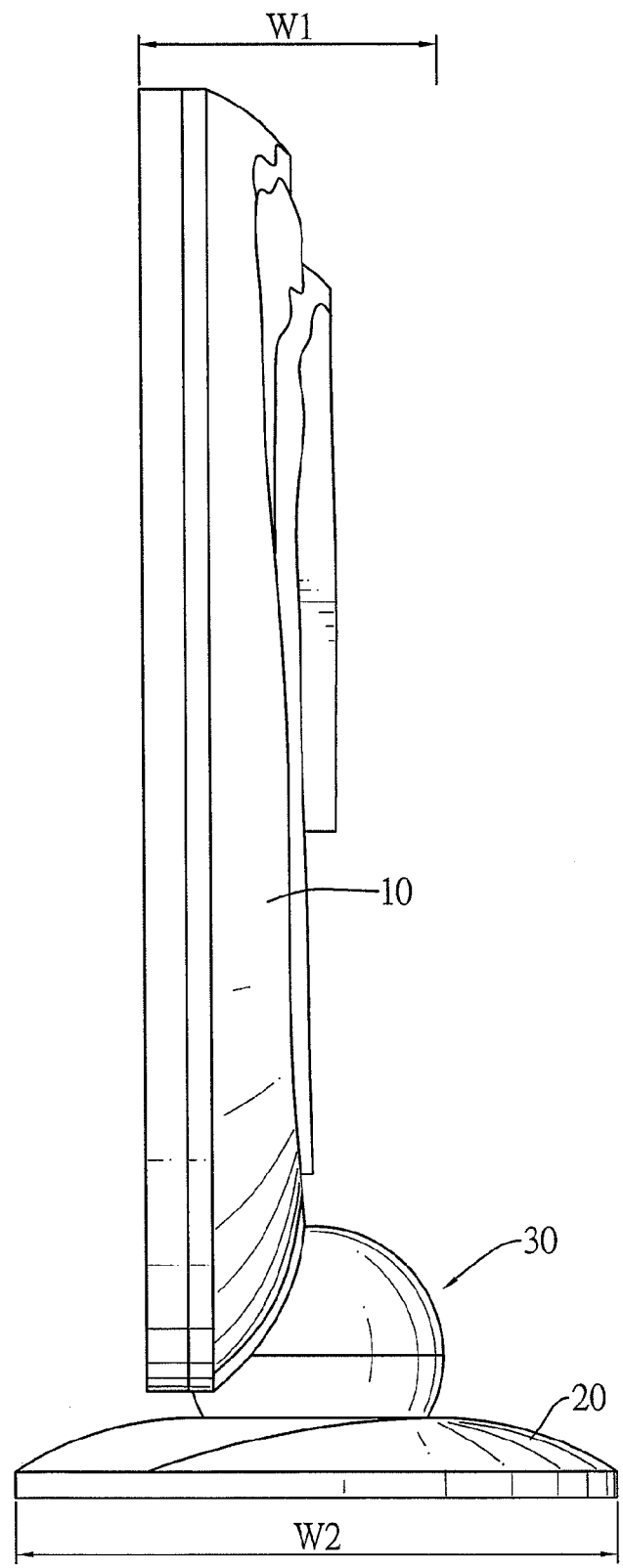
FIG. 5 is a side view of the display.
Figure 6:
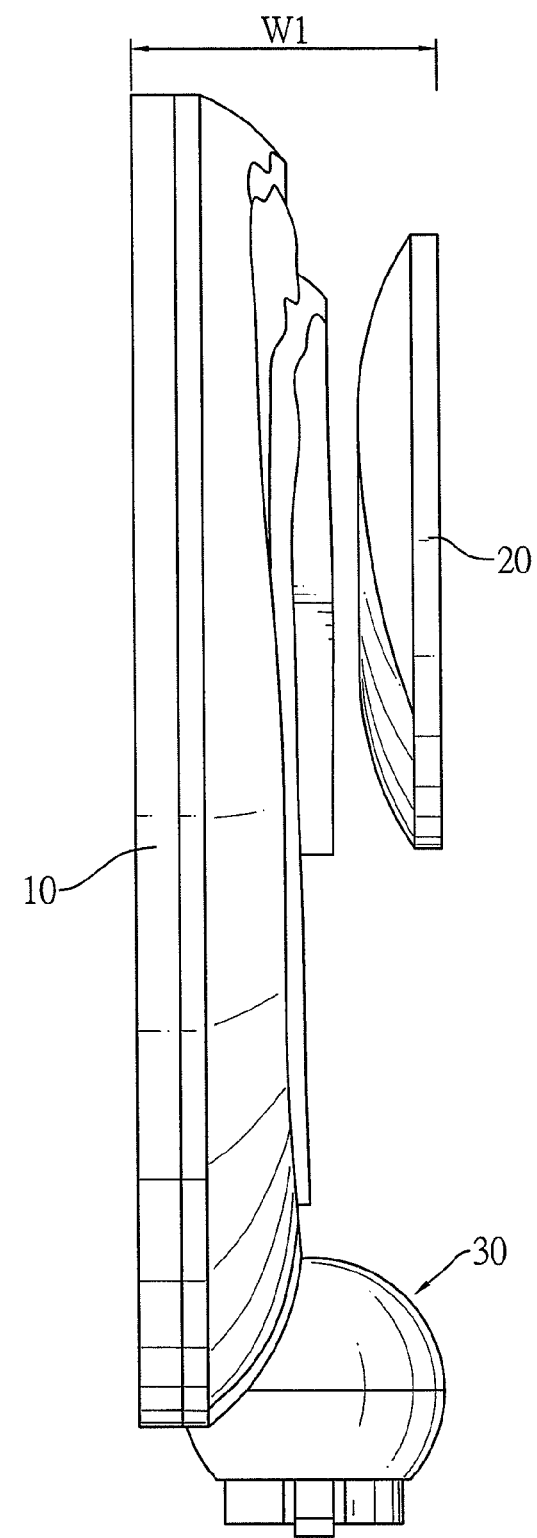
FIG. 6 is a side view of the display from which a base of the base assembly is detached from the pivot unit.

With reference to FIGS. 5 and 6, W1 is the sum of the widths of the screen (10) and the pivot unit (30) and W2 is the width of the base (20), and W2 is lager than W1. If the screen (10) and pivot unit (30) are installed with the base (20), the cost for transporting the display will be expensive due to the packaging size will be larger than W2. However, the pivot unit (30) in the present invention can be easily detached from the base (20). Furthermore, since the pivot unit (30) is attached on the bottom and rear of the screen (10), the L-shaped structure is constituted. Therefore, when the pivot unit (30) is detached from the base (20), the base (20) can be placed behind the rear of the screen (10) in parallel. Accordingly, the width of the packaged screen (10), base (20) and pivot unit (30) will be over W1 but smaller than W2 because the width of the pivot unit (30) plus the width of the screen (10) may be equal to or smaller the width of the screen plus the height of the base (20). Consequently, the cost for transporting the display after detaching the pivot unit (20) from the base (20) will be cheaper than the cost for transporting the display with the pivot unit (20) installed on the base (20).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A base assembly of a display comprising:
   a base having a hollow hole formed downwardly on the top of the base and having
      a top opening;
      an inner side wall connected to the bottom of the hollow hole with the bottom end of the inner side wall;
      a bottom edge defined between the inner side wall and the bottom of the hollow hole; and
      at least one wedge hole formed through and at the bottom edge of the hollow hole; and
   a pivot unit mounted detachably in the hollow hole of the base and comprising
      a spherical body;
         an extending pillar extended downwardly from the spherical body and mounted detachably in the hollow hole of the base; and
         at least one engaging element formed on the outer surface of the extending pillar and mounted detachably through one wedge hole on the base.

2. The base assembly as claimed in claim 1, wherein
   the extending pillar further has at least one recess, and each recess is formed on the outer surface of the extending pillar; and
   each engaging element further has a wedge formed on the bottom end of the engaging element and engaging detachably with the inner side wall of the hollow hole.

3. The base assembly as claimed in claim 2, wherein
   the hollow hole on the base further has a second pivot formed on the top surface of the bottom of the hollow hole; and
   the extending pillar further has a pivot hole formed on the bottom of the extending pillar and corresponding and connecting detachably to the second pivot in the hollow hole of the base.

4. The base assembly as claimed in claim 3, wherein
   the spherical body further comprises
      an upper bowl having
         a lower opening; and
         at least one hook, and each hook formed on the edge of the lower opening of the upper bowl; and
      a lower bowl connected between the upper bowl and the top of the extending pillar and having
         an upper opening corresponding to the lower opening of the upper bowl; and
         at least one hook hole, and each hook hole formed on the edge of the upper opening of the lower bowl, corresponding to the hook on the upper bowl and engaging with the corresponding hook.

5. The base assembly as claimed in claim 2, wherein the base further has at least one notch, and each notch is formed on the bottom of the base, corresponds and connects to the wedge hole and exposes partial bottom end of the inner side wall of the hollow hole to allow the wedge on the engaging element to engage detachably with the bottom end of the inner side wall of the hollow hole.

6. A display comprising:
   a base having a hollow hole formed downwardly on the top of the base and having
      a top opening;
      an inner side wall connected to the bottom of the hollow hole with the bottom end of the inner side wall;
      a bottom edge defined between the inner side wall and the bottom of the hollow hole; and at least one wedge hole formed through and at the bottom edge of the hollow hole;

a pivot unit mounted detachably in the hollow hole of the base and comprising
- a spherical body;
- an extending pillar extended downwardly from the spherical body and mounted detachably in the hollow hole of the base; and
- at least one engaging element formed on the outer surface of the extending pillar and mounted detachably through one wedge hole on the base; and a screen connecting to the pivot unit and having an indentation formed on the bottom of the screen and corresponding and connecting to the pivot unit, and the width of the screen being smaller than the width of the base.

7. The display as claimed in claim 6, wherein
the extending pillar further has at least one recess, and each recess is formed on the outer surface of the extending pillar; and
each engaging element and further has a wedge formed on the bottom end of the engaging element and engaging detachably with the inner side wall of the hollow hole.

8. The display as claimed in claim 7, wherein
the hollow hole on the base further has a second pivot formed on the top surface of the bottom of the hollow hole; and
the extending pillar further has a pivot hole formed on the bottom of the extending pillar and corresponding and connecting detachably to the second pivot in the hollow hole of the base.

9. The display as claimed in claim 8, wherein
the spherical body further comprises
an upper bowl having
- a lower opening; and
- at least one hook, and each hook formed on the edge of the lower opening of the upper bowl; and a lower bowl connected between the upper bowl and the top of the extending pillar and having
- an upper opening corresponding to the lower opening of the upper bowl; and
- at least one hook hole, and each hook hole formed on the edge of the upper opening of the lower bowl, corresponding to the hook on the upper bowl and engaging with the corresponding hook.

10. The display as claimed in claim 7, wherein the base further has at least one notch, and each notch is formed on the bottom of the base, corresponds and connects to the wedge hole and exposes partial bottom end of the inner side wall of the hollow hole to allow the wedge on the engaging element to engage detachably with the bottom end of the inner side wall of the hollow hole.

11. The display as claimed in claim 6, wherein
the spherical body of the pivot unit further has at least one moving slot formed through the outer surface of the spherical body and being vertical and narrow; and
the screen connects to the spherical body of the pivot unit with
- a screw mounted through the bottom of the screen and the moving slot;
- a nut engaged with the screw on the inner surface of the spherical body; and
- a washer sandwiched in between the inner surface of the spherical body and the nut.

* * * * *